United States Patent
Paschke et al.

(10) Patent No.: US 10,384,159 B1
(45) Date of Patent: Aug. 20, 2019

(54) GAS INLET SYSTEM FOR WET GAS SCRUBBER

(71) Applicant: MECS INC, Chesterfield, MO (US)

(72) Inventors: Lawrence F. Paschke, St. Louis, MO (US); Steven F. Meyer, Florissant, MO (US)

(73) Assignee: MECS INC

( * ) Notice: Subject to any disclaimer, the term of this patent is extended or adjusted under 35 U.S.C. 154(b) by 0 days.

(21) Appl. No.: 16/399,025

(22) Filed: Apr. 30, 2019

Related U.S. Application Data (62) Division of application No. 15/109,762, filed as application No. PCT/US2015/010306 on Jan. 6, 2015.

(60) Provisional application No. 61/924,562, filed on Jan. 7, 2014.

(51) Int. Cl.
| | |
|---|---|
| B01D 53/14 | (2006.01) |
| B01D 47/00 | (2006.01) |
| B01D 47/06 | (2006.01) |
| B01D 47/14 | (2006.01) |
| B01D 21/24 | (2006.01) |
| B01D 47/02 | (2006.01) |
| B01D 21/02 | (2006.01) |

(52) U.S. Cl.
CPC ............. *B01D 47/06* (2013.01); *B01D 21/10* (2013.01); *B01D 21/2444* (2013.01); *B01D 47/022* (2013.01); *B01D 47/027* (2013.01); *B01D 47/14* (2013.01); *B01D 2247/04* (2013.01); *B01D 2247/106* (2013.01)

(58) Field of Classification Search
None
See application file for complete search history.

(56) References Cited

U.S. PATENT DOCUMENTS

| | | | | |
|---|---|---|---|---|
| 3,112,352 A | * | 11/1963 | Krantz | B01D 45/10 261/36.1 |
| 3,218,047 A | * | 11/1965 | Calaceto | B01D 47/10 239/110 |
| 3,304,695 A | * | 2/1967 | Krochta | B01D 45/16 261/112.1 |
| 3,696,590 A | * | 10/1972 | Richmond | B01D 47/06 261/112.1 |
| 3,871,305 A | * | 3/1975 | Watanabe | B01D 53/60 110/119 |

(Continued)

*Primary Examiner* — Amber R Orlando
*Assistant Examiner* — Phillip Y Shao (57) ABSTRACT

A gas inlet system for a wet gas scrubber includes a weir configured to deliver liquid to a scrubbing passage to wet the interior surface of the scrubbing vessel during operation of the gas inlet system. The weir include a weir duct and a weir trough extending at least partially around the weir duct to receive and at least partially fill with liquid during operation of the gas inlet system. The weir trough has an upper trough outlet in liquid communication with the upper weir duct inlet to deliver liquid from the weir trough into the upper weir duct inlet during operation of the gas inlet system. The weir trough also has a lower trough outlet below the upper trough outlet. The lower trough outlet is in liquid communication with the scrubbing passage to deliver liquid from the weir trough toward the scrubbing passage during operation of the gas inlet system.

5 Claims, 5 Drawing Sheets

(56) References Cited

U.S. PATENT DOCUMENTS

| | | | | |
|---|---|---|---|---|
| 3,959,420 A | * | 5/1976 | Geddes | B01J 19/0013 261/112.1 |
| 2007/0166205 A1 | * | 7/2007 | Holst | B01D 47/06 422/169 |

* cited by examiner

GAS INLET SYSTEM FOR WET GAS SCRUBBER

CROSS-REFERENCE TO RELATED APPLICATION

This application is a division of application Ser. No. 15/109,762 which represents a national filing under 35 U.S.C. 371 of International Application No. PCT/US2015/10306 filed Jan. 6, 2015, and claims priority of U.S. Provisional Application No. 61/924,562 filed Jan. 7, 2014.

FIELD OF THE DISCLOSURE

The present invention generally relates to a gas inlet system for a wet gas scrubber and an associated method of scrubbing a gas for separation and removal of particulate and gaseous components from gaseous industrial process streams.

BACKGROUND OF THE DISCLOSURE

Various industrial processes produce gaseous streams containing particulate and gaseous components (e.g., sulfur oxides and other sulfur compounds such as $SO_2$, $SO_3$, $H_2S$ and $H_2SO_4$). Such processes include, but are not limited to, for example, fossil fuel-fired power plants, natural gas treatment plants, refineries (e.g., fluid catalytic cracking (FCC) units), sulfur recovery units (SRUs), sulfuric acid plants, metal roasting operations, cement kilns and synthesis gas plants. Before such gas streams can be vented to the atmosphere, they must often be treated to remove the particulate and gaseous impurities.

Gas-liquid contacting devices in which the gaseous stream to be treated contacts an aqueous scrubbing liquid are employed to treat and remove particulate and gaseous impurities from gaseous industrial process streams. For example, in acid production processes, wet gas scrubbers may be used to remove acid gases and particulates from flue gas. There are many types of wet gas scrubbers in the marketplace. However, nearly all wet gas scrubbers share some common characteristics. In most cases, flue gas from the process is not saturated. However, before acid gases such as $SO_2$ can be removed, the gas stream must be adiabatically saturated or "quenched". Most scrubbers will have a section where liquid (e.g., the scrubbing liquid) is contacted with the incoming flue gas to adiabatically saturate, or "quench," the gas stream. Only after the gas has been quenched can acid gas and $SO_2$ removal occur. This is accomplished in two steps: 1) the acid gases are absorbed into the scrubbing liquid; and 2) once absorbed, the acid gases react with a reagent, forming reaction by-products that are then removed from the clean gas. In general, all scrubbers have a method for removing the water droplets and reaction by-products from the gas before the treated gas is discharged from the scrubber.

Gas-liquid contacting devices capable of handling hot and/or corrosive gaseous effluents and operating at high overall liquid to gas ratio (L/G) are often preferred. For example, gas scrubbing systems comprising a reverse jet scrubber of the type disclosed in U.S. Pat. No. 3,803,805 and sold under the trademark DYNAWAVE by MECS, Inc. (Chesterfield, Mo. U.S.A. 63017) are particularly suited for effective separation and removal of particulate and gaseous components from hot gas streams.

Reverse jet scrubbers typically include a gas inlet system and a gas-liquid disengagement vessel downstream of the gas inlet system. The gas inlet system includes a scrubbing vessel that receives the hot, corrosive gas and brings the gas in contact with an intense spray of scrubbing liquid emitted from one or more reverse jets to quench the gas stream and absorb acid gas impurities into the scrubbing liquid and remove particulate contaminants. To prevent thermal and corrosive damage in the vicinity of the hot gas inlet, the upper region of the reverse jet scrubbing vessel is kept cool and cleaned by a continuously flowing liquid film produced by feeding a portion of the scrubbing liquid into the reverse jet scrubber my means of an overflow or leaping weir as described, for example in Canadian Published Application No. 2,050,710. In particular, the overflow weir forms a continuous, flowing film of liquid (such as circulating scrubbing liquid) along the interior surface of the scrubbing vessel in the vicinity of the hot gas inlet. The overflow weir typically includes a weir trough or bowl that fills with liquid and overflows into the scrubbing vessel. This film of flowing liquid protects the equipment from high temperature, and/or excessive corrosion.

However, the effectiveness of reverse jet scrubbing systems can sometimes be adversely affected by the build-up of suspended particles in the circulating scrubbing liquid. The circulating liquid introduced into the scrubbing vessel through the weir often contains suspended particles, such as metal oxides and/or fly ash, that can settle out and deposit in the weir. During operation of the gas inlet system, some of the particulates disengage from the liquid in the weir trough and settle at the bottom of the weir trough. Over time, the particulates may accumulate in the weir trough, leading to problems such as non-uniform overflow of liquid in the weir. In turn, the non-uniform overflow of liquid may lead to dry areas on the interior surface of the scrubbing vessel, which can result in corrosion and ultimately failure of the gas inlet system.

Particulate impurities can be purged from the scrubbing liquid circulating in a reverse jet wet scrubber system. For example, external drains in fluid communication with the weir trough and actuated on an intermittent basis can be used to eliminate the solids that settle out in the weir bowl. In one example, the external drain includes a funnel at the bottom of the weir trough in which disengaged particulates settle and accumulate. An external valve is fluidly connected to the funnel. The valve is periodically opened to allow for flushing and removal of particulates in the funnel.

Although the overflow weir and the external drains have worked quite well in most applications, the inventors of the claimed invention have identified several potential issues with the overflow weir and the external drains, as described below. The inventors do not concede that these issues are known in the prior art or readily identifiable to those of ordinary skill in the art.

The external drains may be costly to fabricate and install at the site, and require external piping, valves, wiring and heat tracing. Moreover, because these external drains operate on an intermittent basis, if the purge cycle is disrupted for any reason, including valve failure, operator error, equipment failure, etc., the liquid film can be disrupted and the equipment damaged by the corrosive gas. If overflow was disrupted along the upper end of the weir, for whatever reason, a dry spot(s) may occur in the scrubbing vessel. The dry spot may lead to corrosion and/or overheating of that area of the vessel, and ultimately failure of the gas inlet system. Moreover, if solids build up too quickly, the external drains could become clogged. When this happens, additional solids would settle until flow over the upper end of the weir is disrupted. As another example, the external drain valves could either fail to open, which would cause solids build-up, or they could remain open too long, and disrupt flow over the weir.

Accordingly, in view of the above-identified potential issues with conventional gas inlet systems, a need persists for improved weir and gas inlet system designs for wet gas scrubbers that provide for effective, continuous removal of accumulating solid impurities from the circulating scrubbing liquid.

SUMMARY OF THE DISCLOSURE

In one aspect, a gas inlet system for a wet gas scrubber generally comprises a scrubbing vessel and a weir. The scrubbing vessel has an interior surface defining a scrubbing passage and is configured to receive a gas and a scrubbing liquid so that the gas contacts the scrubbing liquid during operation of the gas inlet system. The weir is disposed above and in fluid communication with the scrubbing passage. The weir is configured to deliver liquid to the scrubbing passage to wet the interior surface of the scrubbing vessel during operation of the gas inlet system. The weir includes a weir duct and a weir trough. The weir duct has at least one side wall, an interior weir duct passage, an upper weir duct inlet in fluid communication with the interior weir duct passage, and a lower weir duct outlet in fluid communication with the weir duct passage. The weir trough extends at least partially around the at least one side wall of the weir duct and is configured to receive and at least partially fill with liquid during operation of the gas inlet system. The weir trough has an upper trough outlet in liquid communication with the upper weir duct inlet and is configured to deliver liquid from the weir trough into the upper weir duct inlet during operation of the gas inlet system, whereby liquid is directed from the weir duct passage through the lower weir duct outlet and toward the scrubbing passage to facilitate wetting of the interior surface of scrubbing vessel during operation of the gas inlet system. The weir trough has a lower trough outlet below the upper trough outlet. The lower trough outlet is in liquid communication with the scrubbing passage and configured to deliver liquid from the weir trough toward the scrubbing passage during operation of the gas inlet system.

In another aspect, a method of scrubbing a gas generally comprises filling, at least partially, a weir trough of a gas inlet system of a gas scrubber with a liquid. The weir trough is disposed above a scrubbing passage defined by a scrubbing vessel and at least partially surrounds a weir duct defining a weir duct passage. Liquid is delivered from the weir trough through an upper trough outlet of the weir trough and into the weir duct passage. Liquid exiting the upper trough outlet flows through the weir duct passage and subsequently flows downward into the scrubbing passage and facilitates wetting of an interior surface of the scrubbing vessel defining the scrubbing passage. Liquid is delivered from the weir trough through a lower trough outlet of the weir trough and into the scrubbing passage. Liquid exiting the lower trough outlet facilitates wetting of the interior surface of the scrubbing vessel defining the scrubbing passage. A gas and a scrubbing liquid are introduced into the scrubbing passage such that the gas and scrubbing liquid contact one another.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE DISCLOSURE

Figure 1:
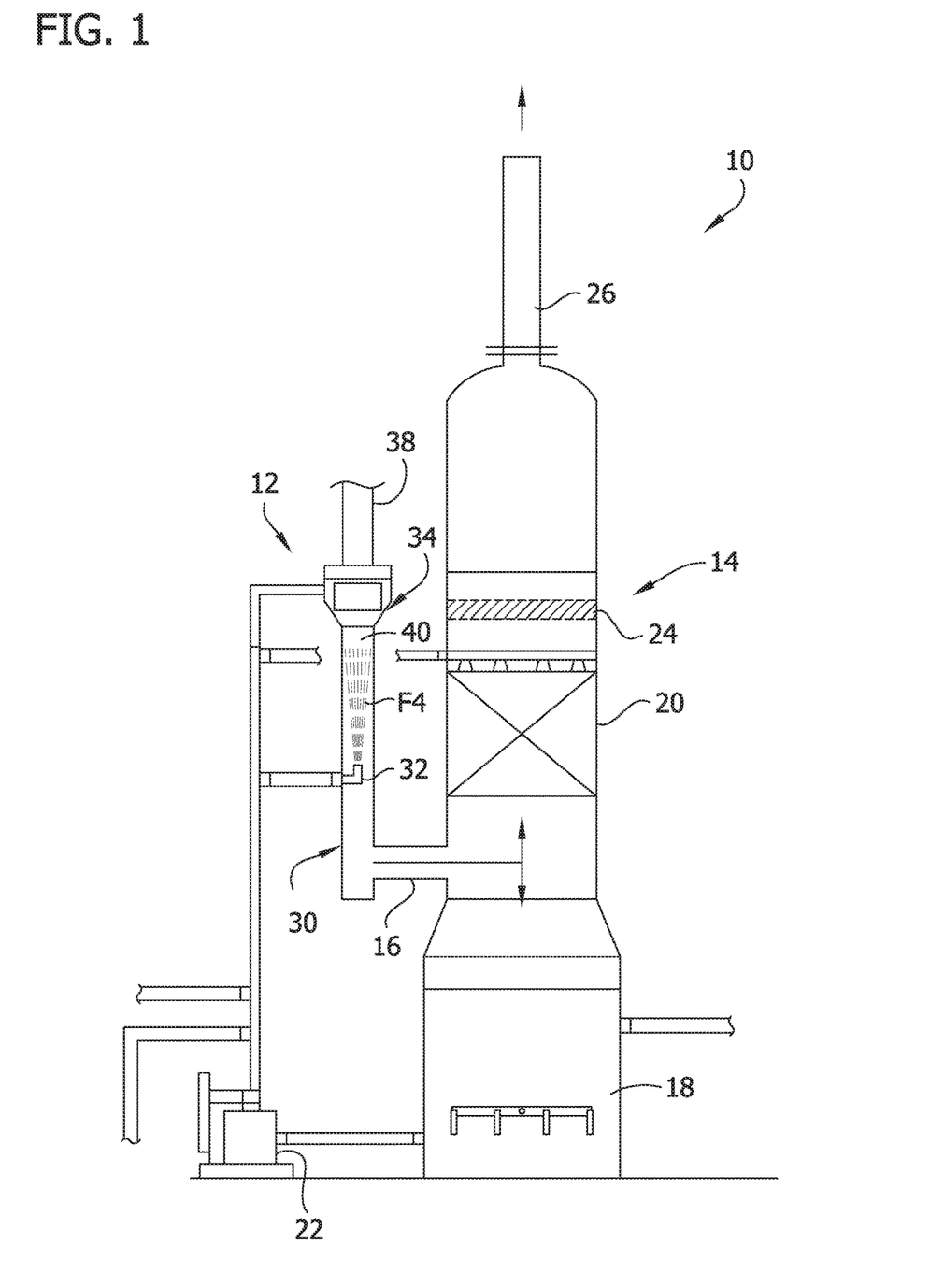
FIG. 1 is a schematic of one embodiment of a gas scrubber including a gas inlet system and a gas-liquid disengagement vessel.

Referring to FIG. 1, a schematic of one embodiment of a wet gas scrubber is generally indicated at reference numeral 10. The illustrated wet gas scrubber 10 includes a gas inlet system, generally indicated at 12, and a gas-liquid disengagement vessel, generally indicated at 14, in fluid communication with the gas inlet system. In general, and as explained in more detail below, the gas inlet system 12 is configured to receive gas (e.g., hot gas) effluent from an industrial process and bring the hot gas in contact with a scrubbing liquid to both cool the hot gas and remove contaminants from the gas. As an example, the hot gas effluent may be derived from metal roasting operations. After coming into contact with one another within the gas inlet system 12, the wet gas and the spent scrubbing liquid exit the gas inlet system through an outlet 16 and enter the gas-liquid disengagement vessel 14. Within the gas-liquid disengagement vessel 14, the spent scrubbing liquid and the wet gas disengage or separate so that the spent scrubbing liquid collects in a lower sump 18 and the wet gas flows upward through a gas outlet duct or tower 20. The spent scrubbing liquid in the sump 18 is recycled and delivered back to the gas inlet system 12 via a pump 22. The wet gas in the tower 20 flows through a demister 24 (e.g., chevron) and/or other gas/liquid separation devices before exiting the tower through a tower outlet 26. The foregoing brief descriptions of some of the components of the illustrated wet gas scrubber 10 are generally known in the art, and other processes or devices may be included in the wet gas scrubber without departing from the scope of the present invention defined by the claims.

As shown generally in FIG. 1, the illustrated gas inlet system 12 includes a scrubbing vessel, generally indicated at 30, a jet nozzle 32 within the scrubbing vessel for delivering the scrubbing liquid into the scrubbing vessel, and a weir, generally indicated at 34, in fluid communication with and disposed above the scrubbing vessel. As described in more detail below, the weir 34 is configured for wetting an interior surface 36 (see, e.g., FIG. 2) of the scrubbing vessel 30 defining a scrubbing passage 37. A gas inlet tube 38 extends through an open upper end of the weir 34 for delivering hot gas into the scrubbing vessel 30. The hot gas from the gas inlet tube 38 flows in a downward direction in the scrubbing passage 37, and the scrubbing liquid from the jet nozzle 32 flows in an upward direction in the scrubbing passage. The hot gas and the scrubbing liquid collide with one another to create a turbulent zone 40 (called a "froth zone") within the scrubbing passage 37. In the froth zone 40, the gas/liquid interface is continuously and rapidly renewed. When the momentum of the gas and liquid balances, the liquid reverses direction and flows downward in the scrubbing passage 37. The scrubbed gas and the spent liquid exit the scrubbing vessel 30 and enter the gas-liquid disengagement vessel 14, as explained above. As is generally known in the art, the illustrated wet gas scrubber 10 is generally of the type referred to as a "counter-current scrubber" because hot gas and scrubbing liquid flow in opposing directions within the scrubbing vessel 30. It is understood that in other embodiments, the wet gas scrubber 10 may be a "co-current scrubber," whereby the hot gas and the scrubbing liquid flow in the same direction (e.g., a downward direction) within the scrubbing vessel 30. The gas inlet system 12 may include other types of scrubbing vessels without departing from the scope of the present invention.

Figure 2:
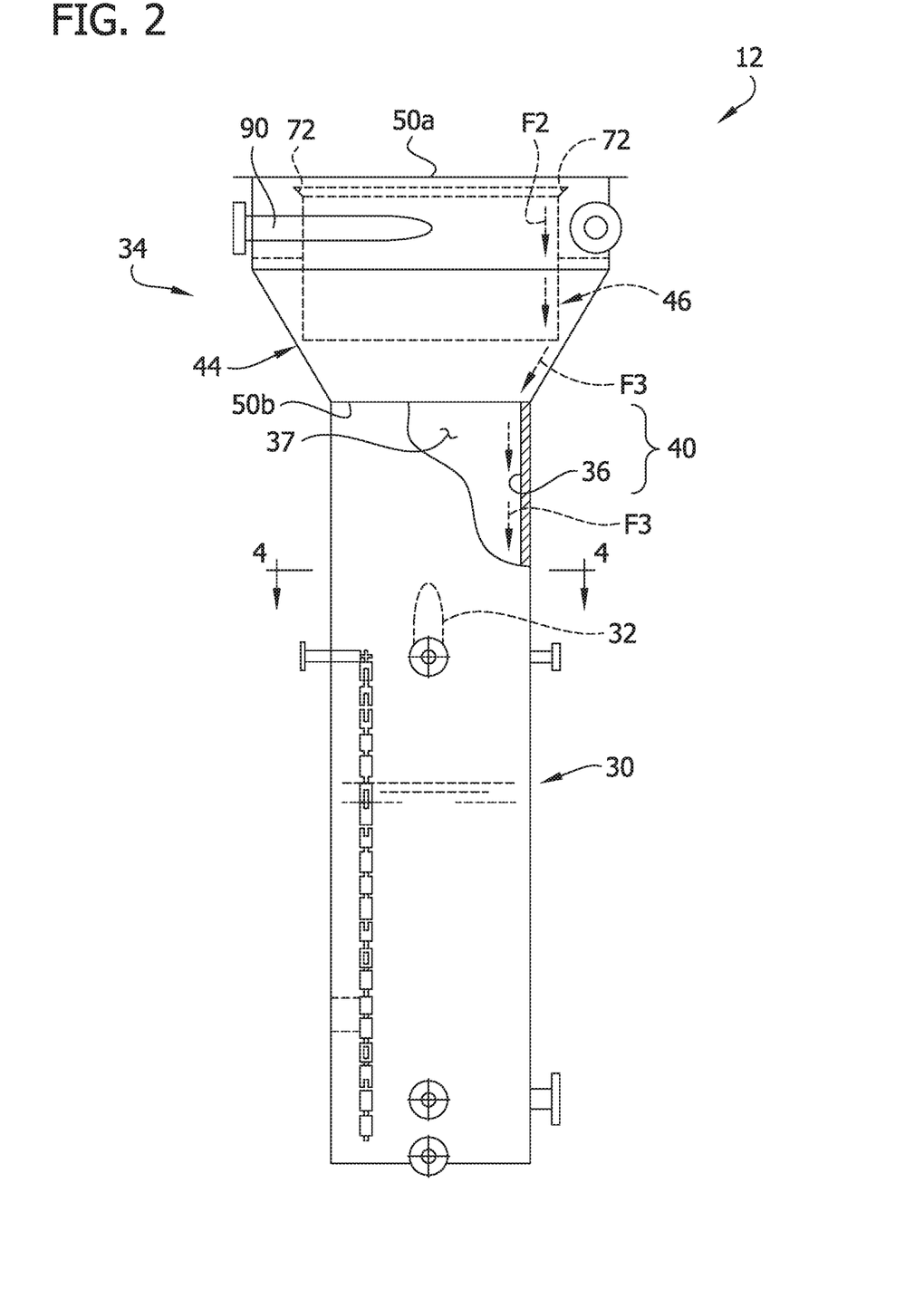
FIG. 2 is a front elevation of the gas inlet system, including a weir and a scrubbing vessel.
Figure 3:
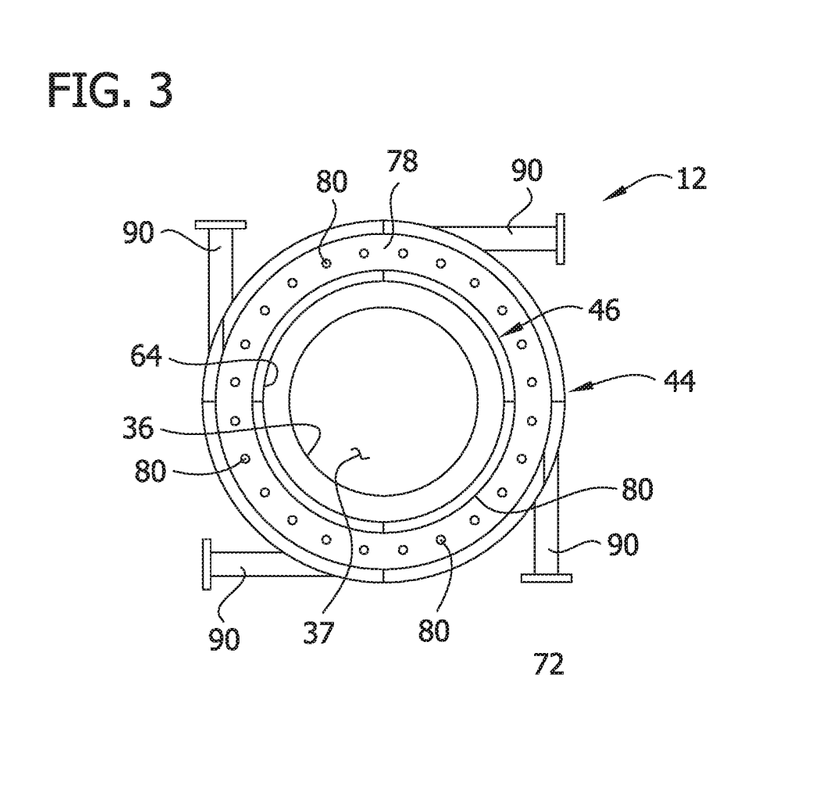
FIG. 3 is a top plan view of the gas inlet system of FIG. 2.
Figure 4:
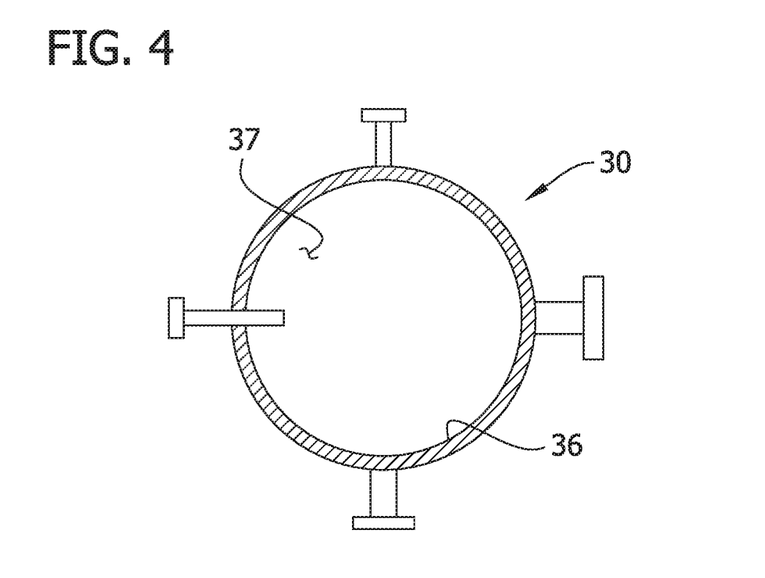
FIG. 4 is a cross section taken through the plane defined by the line 4-4 in FIG. 2.

Referring to FIGS. 2 and 3, the weir 34 of the gas inlet system 12 is configured to wet the interior surface 36 of the scrubbing vessel 30 by forming a film or layer of liquid flowing downward over the interior surface during operation of the gas inlet system. The liquid may be scrubbing liquid and may come from the same source as the scrubbing liquid delivered through the jet nozzle 32, as explained below. The weir 34 includes an outer weir receptacle, generally indicated at 44, and an inner weir duct, generally indicated at 46, received in the weir receptacle.

Figure 5:
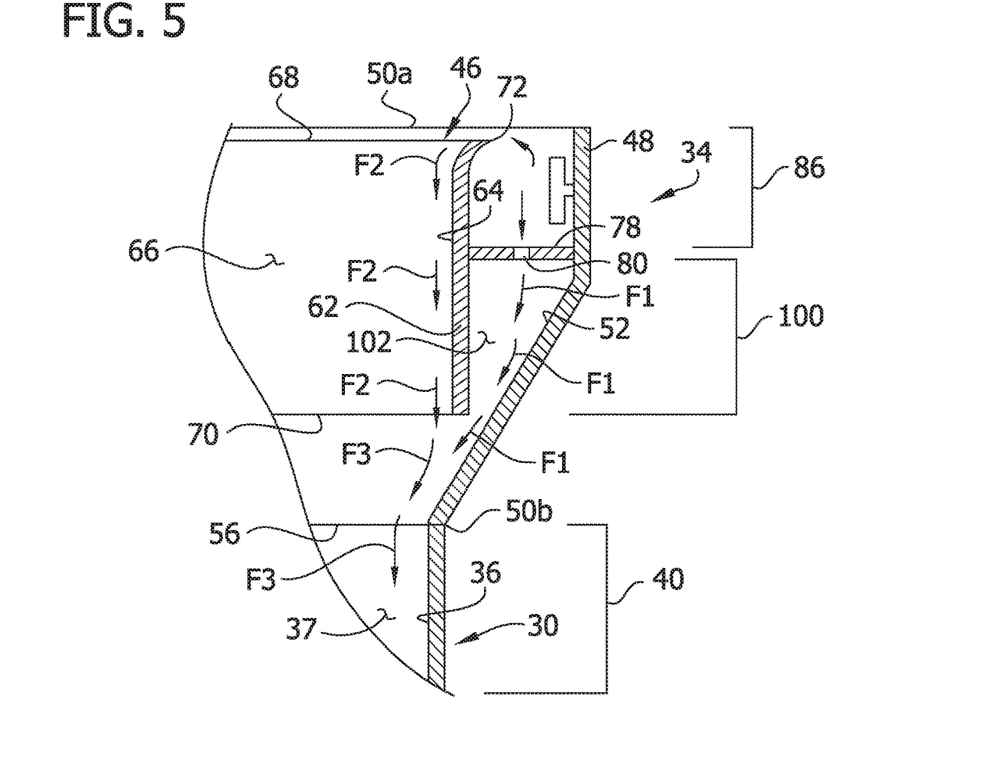
FIG. 5 is an enlarged, partial longitudinal section of an upper portion of the gas inlet system of FIG. 2.

Referring to FIG. 5, the weir receptacle 44 has a side wall 48, open upper and lower ends 50a, 50b, respectively, and an interior surface 52 defining an interior space in which the weir duct 46 is received. The lower end 50b of the weir receptacle 44 defines an outlet 56 of the weir that is in fluid communication with the scrubbing vessel 30. The interior surface 52 at an upper portion 58 of the weir receptacle 44 has a generally annular shape, and the interior surface at a lower portion 60 of the weir receptacle has a generally cone shape that tapers or slopes downward toward the open lower end 50b of the weir receptacle. The weir duct 46 has a side wall 62, an interior surface 64 defining an interior duct passage 66, an upper duct inlet 68 in communication with the interior duct passage, and a lower duct outlet 70 in communication with the duct passage. In the illustrated embodiment, the upper duct inlet 68 is defined by an upper end of the weir duct 46, and the lower duct outlet 70 is defined by a lower end of the weir duct. The weir duct 46 has a generally cylindrical shape with a weir lip 72 extending laterally outward at the upper end of the duct. A securement flange 78 extends laterally between and interconnects the weir duct 46 and the weir receptacle 44 to fixedly secure the duct in the receptacle. The securement flange 78 has an annular shape and extends around a perimeter of the side wall 62 of the weir duct 46, although the securement flange may be of other shapes. For reasons explained below, the securement flange 78 has at least one opening 80, and in the illustrated embodiment, the securement flange has a plurality of openings (as shown in FIG. 3) spaced apart from one another around the securement flange. Also for reasons explained below, as secured within the weir receptacle 44, the upper end of the weir duct 46 is disposed below the upper end 50a of the weir receptacle 44 by a distance d1, and the lower end of the weir duct is spaced laterally (or horizontally) apart from the interior surface 52 of the weir receptacle 44 by a distance d2 to define an annular opening 84 there between. The weir duct 46, the weir receptacle 44, and the securement flange 78 may be formed from stainless steel or other metal. The securement flange 78 may be secured to the weir duct 46 and the weir receptacle 44 by welding or in other suitable ways. The weir 34 may be of other configurations without departing from the scope of the claimed invention.

Figure 6:
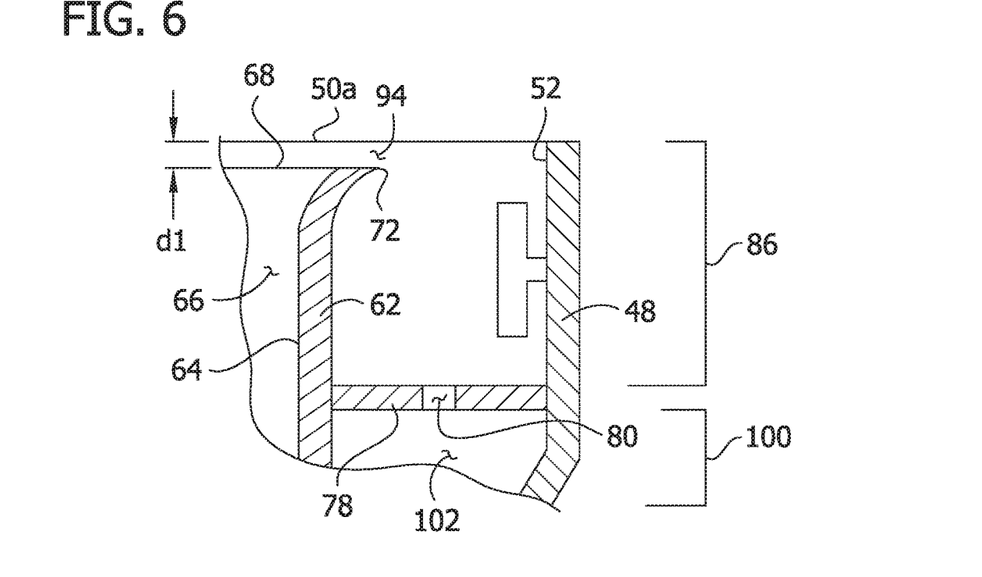
FIG. 6 is an enlarged, partial view of an upper portion of the cross section of FIG. 5.

Referring to FIGS. 5 and 6, a weir trough 86 of the weir 34 is defined by the weir duct 46, the weir receptacle 44, and the securement flange 78. In particular, the illustrated weir trough 86 is generally in the form of an annular channel, with the side wall 62 of the weir duct 46 defining an inner side of the trough, the side wall 48 of the weir receptacle 44 defining an outer side of the trough, and the securement flange 78 defining a bottom of the trough. The weir trough 86 at least partially surrounds the upper portion of the weir duct 46, and in the illustrated embodiment, the weir trough completely surrounds the upper portion of the duct. The weir trough 86 is configured to be at least partially filled with liquid during operation of the gas inlet system 12. As shown in FIGS. 2 and 3, the illustrated weir trough 86 includes at least one trough inlet 90 (e.g., 4 inlets) extending through the weir receptacle 44 (i.e., through the outer side of the trough 86). The illustrated trough inlets 90 are configured to direct liquid in a generally horizontal direction and tangentially along side wall 48 of weir receptacle 44 so that the flowing liquid generally swirls around the weir trough 86. The weir trough 86 and/or the inlet(s) 90 may be formed in other ways and may be of other configurations without departing from the scope of the claimed invention.

Figure 7:
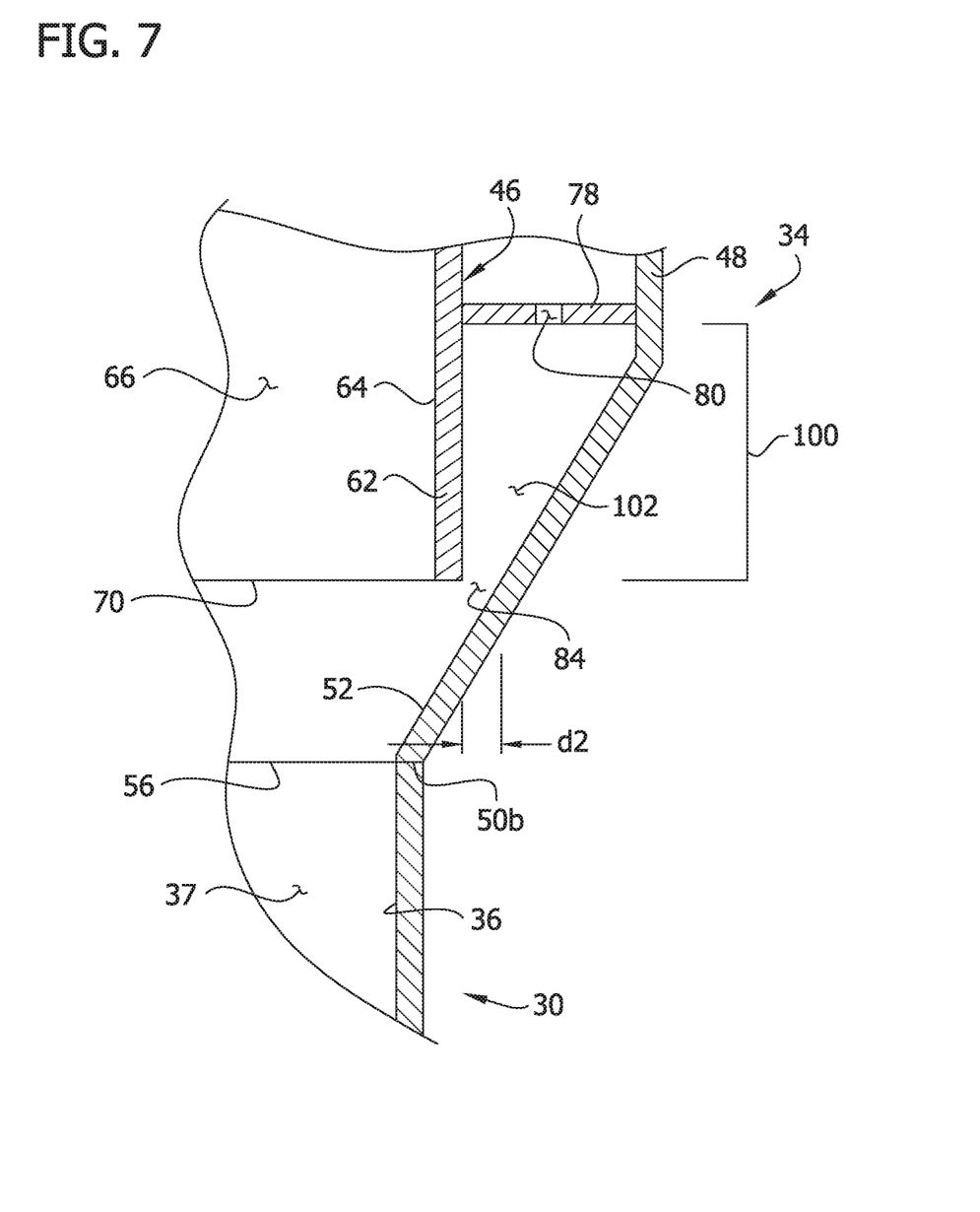
FIG. 7 is an enlarged, partial view of a lower portion of the cross section of FIG. 5.

Referring to FIGS. 5-7, the weir trough 86 also has two trough outlets: an upper trough outlet 94 and a lower trough outlet defined by the at least one opening 80 in the securement flange 78 (i.e., the bottom of the weir trough 86). The upper trough outlet 94 is at the upper end of the weir duct 46 and is in liquid communication with the upper weir duct inlet 68 to allow liquid in the weir trough 86 to overflow relative to the weir duct such that liquid flows over the weir lip 72 at the upper end of the duct, through duct passage 66 and toward the weir outlet 56 at the lower end of the weir 34. This overflow through the upper trough outlet 94 is due to the upper end of the weir duct 46 being disposed below the upper end 50a of the weir receptacle 44 (e.g., the outer side wall of the trough is disposed above the inner side wall). Thus, in this regard, the weir 34 functions as an overflow or leaping weir. The lower trough outlet 80 is in liquid communication with a bypass 100 defined by the lower portion of the weir duct 46 and the cone-shaped interior surface 52 of the lower portion of the weir receptacle 44. The bypass 100 defines a bypass conduit 102 having a bypass outlet defined by the annular opening 84 between the lower end of the weir duct 46 and the cone-shaped interior surface 52 of the weir receptacle 44. The cone-shaped interior surface 52 of the weir receptacle 44 funnels liquid toward the bypass outlet 84. The bypass outlet 84 is in liquid communication with the weir outlet 56 and the scrubbing passage 37 to ultimately fluidly connect the lower trough outlet 80 with the scrubbing passage. Accordingly, the lower trough outlet 80 and the bypass 100 function as a duct bypass to deliver liquid from the weir trough 86 to the scrubbing passage 37 without flowing through the duct passage 66. Both the upper and lower trough outlets 94, 80, respectively (and the bypass outlet 84), are continuously open during operation of the gas inlet system 12, and the outlets are free from devices allowing selective flow obstruction. For example, the outlets 94, 80 are free from valves or other devices that allow for selective closure of the outlets.

It is understood that one or both of the upper and lower trough outlets 94, 80, respectively, may be formed in other ways in other embodiments. For example, the upper trough outlet may be formed as one or more openings in the side wall 62 of the weir duct 46. With respect to the lower trough outlet, in a non-limiting example, the outlet may be formed by a tube or conduit or other component. Moreover, in one non-limiting example, the tube or conduit forming the lower trough outlet may be external or internal with respect to the weir receptacle. It is also understood that the bypass 100 and the bypass outlet 84 may be formed in other ways. Moreover, the gas inlet system 12 may not include a separate bypass, such as the bypass 100. For example, the lower trough outlet 80 may drain directly into the lower portion of the weir 34 and/or directly into the scrubbing passage 37, without directing liquid into the weir duct 46, whereby the lower trough outlet alone functions as a duct bypass. In another example, the lower trough outlet 80 may be in fluid communication with the duct passage 66, whereby a duct bypass is not present. Other configurations are possible within the scope of the claimed invention.

A non-limiting embodiment of a method of using the illustrated gas inlet system 12 will now be described. At the onset of operation, liquid is delivered to the trough inlets 90 via the pump 22 or other device. In this example, liquid delivered to the weir trough 86 is scrubbing liquid from the same source that is in liquid communication with the jet nozzle 32. From the trough inlets 90, the liquid flows into the weir trough 86 in a generally horizontal direction and tangentially along side wall 48 of weir receptacle 44, as described above, although the liquid may flow in any suitable direction. As the liquid initially enters the weir trough 86, a portion of the liquid flows downward through the lower trough outlet 80 (defined by the openings 80 in the securement flange 78), through the bypass 100 and the weir outlet 56 as a liquid film and then into the scrubbing passage 37 (thus bypassing the duct passage 66). The flow of liquid through the lower trough outlet 80 and through the bypass 100 is indicated by the arrows having reference characters F1 in FIG. 5. The flow rate of liquid into the weir trough 86 is greater than the net flow rate through the lower trough outlet 80, so that the weir trough fills with liquid concurrently with liquid flowing through the lower trough outlet. When the weir trough 86 is filled with liquid above the weir lip 72 at the upper end of the weir duct 46, liquid overflows through the upper duct inlet 68 and into the duct passage 66. The flow rate and distribution of the liquid over the weir lip 72 and into the duct passage 66 is such that the liquid flows as a thin film on the interior surface 64 defining the duct passage. The thin film of liquid substantially covers the entire interior surface 64 of the weir duct 46 and flows downward through the lower duct outlet 70. The flow of the thin film of liquid through the duct passage 66 is indicated by the arrows having reference characters F2 in FIG. 5. The liquid film F2 exits the duct passage 66 and joins the liquid film F1 from the bypass 100 at the lower, tapering portion of the weir receptacle 44 adjacent the weir outlet 56 to form a combined thin film of liquid. The flow of the combined film of liquid is indicated by the arrows having reference character F3 in FIG. 5. The combined film of liquid F3 flows downward through the weir outlet 56 and then along the interior surface 36 defining the scrubbing passage 37. The combined film of liquid F3 substantially covers the entire interior surface 36 of the scrubbing vessel 30. Liquid continuously flows into the weir trough 86 via the trough inlets 90, and liquid continuously and concurrently flows through the upper and lower trough outlets 94, 80, respectively, to produce a continuous combined thin film of liquid F3 flowing downward along the interior surface 36 defining the scrubbing passage 37.

Concurrently with the continuous combined liquid film F3 flowing along the interior surface 36 defining the scrubbing passage 37, scrubbing liquid is continuously delivered into the scrubbing passage via the jet nozzle 32 to produce an upward flow of scrubbing liquid in the scrubbing passage. The upward flow of scrubbing liquid is indicated by the arrows having reference character F4 in FIG. 1. The scrubbing liquid may be introduced via the jet nozzle 32 before, after, or concurrently with the initial delivery of liquid into the weir trough 86. After forming the continuous combined film of liquid F3 and the upward flow of scrubbing liquid in the scrubbing passage 37, hot gas is introduced into the scrubbing passage via the gas inlet tube 38. Hot gas is continuously delivered into the scrubbing passage 37 concurrently with the continuous flow of the combined liquid film F3 and the upward flow of scrubbing liquid F4. The hot gas collides with the upward flow of scrubbing liquid F4 at the froth zone 40. In the froth zone 40, the gas/liquid interface is continuously and rapidly renewed. When the momentum of the gas and liquid balances, the liquid reverses direction and flows downward in the scrubbing vessel 30. The scrubbed gas and the spent liquid exit the scrubbing vessel 30 and enter the gas-liquid disengagement vessel 14. The continuous flowing liquid films F2 and F3 inhibit corrosion of the respective interior surfaces 36, 52 and 64 of the gas inlet system 12 due to the hot gas flowing into the system.

The parameters of the gas inlet system 12, including but not necessarily limited to the dimensions of the weir trough 86, the number and areas of the openings 80 of the securement flange 78, the area of the bypass outlet 84 (i.e., the annular opening), and the flow rate of liquid into the weir trough, are interdependent in order to achieve both the desired wetting of the interior surfaces 36, 52 and 64 of the gas inlet system (i.e., the desired formation of the thin films F2, F3), and the desired draining or flushing of the weir trough through the lower trough outlet 80 to inhibit accumulation of particulates in the weir trough. For example, the individual area of each opening 80 in the securement flange 78 should be large enough to inhibit particulates in the liquid from clogging the outlet. However, if the area of each opening 80 is too large and/or if the number of openings is too numerous, the combined flow rate through the openings may inhibit the weir trough 86 from filling with liquid, which would inhibit overflow of liquid through the upper trough outlet 94. Moreover, the flow rate into the weir trough 86 and the volume of liquid held by the weir trough (and possibly other parameters of the trough) also affects whether the weir trough appropriately fills with liquid such that the appropriate flow rate is achieved through the upper and lower trough outlets 94, 80, respectively, to produce the continuous flowing film F2, F3 along the interior surfaces 36, 52 and 64 defining the scrubbing passage 37 and the duct passage 66. If the flow rate of liquid through the upper and lower trough outlets 94, 80, respectively, is too high, the flowing liquid films F2, F3 may not be satisfactorily achieved because the liquid may detach from the interior surfaces. Moreover, if the flow rates through the upper and lower trough outlets 94, 80, respectively, is too low, the flowing liquid films F2, F3 may be too thin or may not adequately cover the interior surfaces 36, 52 and 64.

In one non-limiting example, parameters of the gas inlet system 12 may be chosen by first establishing a flow rate of liquid into the weir trough 86 and determining the height of the weir trough, which determines the available pressure of the liquid in the trough. With the flow rate and pressure established, the combined or total open area of the openings 80 in the securement flange 78 (i.e., the openings in bottom of the trough) can be calculated to achieve a desired flow rate through the lower trough outlet, as defined by the openings. Then, the number of openings 80 (or drains) to install in the securement flange 78, and the area of each, can be determined. More openings 80 is beneficial in that the liquid would be introduced in more locations. However, each opening 80 would be smaller as the number of openings increased. If the openings 80 are too small, they could then become plugged. Thus, the location, the number and the size of the openings should be determined.

The gas inlet system 12, and more specifically the weir 34, may provide one or more of the following advantages during operation of the wet gas scrubber 10. As a non-limiting example, the weir 34 of the present disclosure inhibits build-up or accumulation of particulates in the weir trough 86. During operation, the lower trough outlet 80 (e.g., the openings 80 in the securement flange 78 defining the bottom of the weir trough 86) continuously drains the weir trough to inhibit the accumulation of particulates suspended in the liquid. Continuously draining the weir trough 86 has the effect of continuously flushing any particulates from the liquid that settle or could settle at the bottom 78 of the weir trough. Moreover, the lower trough outlet 80 and the bypass 100 function as an internal drain system because the lower trough outlet and bypass are contained within the gas inlet system 12 and drain liquid into the scrubbing passage 37 of the gas inlet system 12. Thus, external tubes or valves or pumps, which remove the particulates from a conventional gas inlet system, are not required to remove particulates from the weir trough 86. As explained above, liquid flows through the bypass outlet 84 as a liquid film F1 on the interior surface 52 of the weir receptacle 44 and joins the liquid film F2 flowing out of the weir duct 46 to form a combined liquid film F3 that flows into the scrubbing passage 37. In the illustrated embodiment, the two liquid films F1, F2 join adjacent to and upstream from the weir outlet 56 to form the combined liquid film F3. This combined liquid film F3 provides the additional advantage of facilitating wetting of the interior surface 36 defining the scrubbing passage 37. Moreover, if one of the liquid films F1, F2 fail, the other liquid film becomes a failsafe or backup that continues to wet the scrubbing passage 37. Thus, the formation of one liquid film (e.g., F1) is not dependent on the formation of the other liquid film (e.g., F2) and vice versa (i.e., the liquid films form independently of one another).

EXAMPLE

The following is a non-limiting example demonstrating the process of determining the parameters of the gas inlet system.

A goal of the design of the gas inlet system 12 is to have liquid flow rate of liquid the openings 80 in the securement flange 78 (i.e., liquid flow rate through the lower trough outlet) be equal to about 50% of the liquid flow rate over the upper end of the weir 34 (i.e., liquid flow rate through the upper trough outlet 94).

Using the above disclosed embodiment of the gas inlet system 12, below are the steps and parameters used in the design of a working gas inlet system.

The following parameters are first chosen or calculated:
Outer diameter of weir duct 46 is 48", (or 4 feet).
Design criteria for flow over the weir duct 46 (i.e., flow rate through the upper trough outlet) is 20 gpm per foot of the perimeter of the weir duct.
$F_w$=Flow rate over the upper end of the weir duct (flow through upper trough outlet)=π×4 feet×10 gpm/ft=252 gpm.
$F_h$=Flow through openings 80 in the securement flange 78 (flow rate through the lower trough outlet)=½×$F_w$=126 gpm
$F_t$=Total flow rate into the weir trough (combined flow rate through trough inlets)=$F_w$+$F_h$=252 gpm+126 gpm=378 gpm Next, the amount of open area required for the openings 80 in the securement flange 78 for a flow rate of 126 gpm is determined. From design above, there will be a liquid head, H, over the openings 80 in the securement flange 78 of 10.5". This assumes the weir trough 86 is filled to the upper end of the weir. Since there will be flow over the weir duct 46, this is a reasonable assumption.

First, the velocity through each opening 80 is determined. The form of the equation is:

$$H = K \times (V^2/2g)$$

H=liquid head in feet of water=10.5"/12"/ft=0.875 feet
K=resistance co-efficient=1 for a sudden enlargement.
V=velocity of the liquid through the opening 80 in feet per second, which is the unknown to solve.
g=acceleration of gravity=32.2 ft/sec²
So, substituting the values:

$$0.875 \text{ feet} = 1.0 \times (V^2/(2 \times 32.2 \text{ ft/sec}^2))$$

Solving the above equation:

$$V = 7.5 \text{ feet per second}.$$

Next, the total area required for the openings 80 is solved, which will be called $A_{ht}$. The liquid flow is set at 126 gpm. Converting this value to cubic feet per second, and then dividing by the velocity:

$$F_h = 126 \text{ gal/min} \times (\text{ft}^3/7.48 \text{ gal}) \times (\text{min}/60 \text{ sec}) = 0.28075 \text{ ft}^3/\text{sec}.$$

$$A_{ht} = F_h/V = 0.28075 \text{ ft}^3/7.5 \text{ ft/sec} = 0.037433 \text{ ft}^2 = 5.3904 \text{ in}^2$$

The number of openings 80 to use is then selected. As the number of openings 80 increases, the area per opening will go decrease. However smaller openings 80 are more prone to plugging. Moreover, too few of opening 80 will lead to space between the openings increasing, and this will provide areas at the bottom 78 of the trough 86 for solids to build. The perimeter of the weir duct 46 is used a guideline since the flow rates are based off of it. The basis is to have 1 opening 80 at 6" intervals of the weir duct perimeter.

Weir duct perimeter=48"×π=150.8 inches. Therefore, number of openings is 150.8"/6" per opening=25.133 holes. Rounding this number off to the closest whole number that is divisible by 4, the total number of openings is 24. Accordingly, the area required per opening=$A_{ht}$/# of holes=5.3904 in²/24=0.2246 in² per opening.

The individual opening diameter, Dh, is determined from this area, as follows:

$$(\pi/4) \times (D_h^2) = 0.2246 \text{ in}^2$$

Then, Dh=0.535 inch.
Round this value off to the nearest fraction leads to:
Each of the 24 openings has a diameter of 17/32".

$$\text{Actual area per opening} = (\pi/4) \times (0.53125 \text{ in})^2 = 0.22166 \text{ in}^2$$

$$A_{ht} = 24 \times 0.22166 \text{ in}^2 = 5.32 \text{ in}^2 \times (\text{ft}^2/144 \text{ in}^2) = 0.0369 \text{ ft}^2$$

$$F_h = (0.0369 \text{ ft}^2) \times (7.5 \text{ ft/sec}) \times (60 \text{ sec/min}) \times (7.48 \text{ gal/ft}^3) = 124 \text{ gpm}.$$

The actual calculated flow through the openings 80 is 124 gpm, and is approximately 49% of liquid flowing over the upper end of the weir duct 46 and into the duct passage 66. Each opening has a 17/32" diameter which should be sufficiently large to avoid plugging. Also, the openings 80 are close enough to one another such that no large areas of the securement flange 78 are left unprotected from the build-up of particulate impurities.

The liquid that drains through the openings 80 must pass through the annular opening 84 (i.e., the bypass outlet) between the weir duct 46 and the weir receptacle 44. The width of the annular opening 84 (defined by d2) is approximately 5/8". Thus, the total area for the liquid to flow through the annular opening $84 = (\pi \times 48 \text{ in} \times 0.625 \text{ in}) = 94.25 \text{ in}^2$. This area is significantly greater than the combined area of the openings 80, and should not cause a backup or accumulation of liquid in the bypass 100. In addition, the liquid exiting the openings 80 will strike the cone-shaped interior surface 52 partially defining the bypass 100, which will tend to distribute this liquid around the entire perimeter of the interior surface adjacent the annular opening 84.

Having described the invention in detail, it will be apparent that modifications and variations are possible without departing from the scope of the invention defined in the appended claims.

When introducing elements of the disclosed embodiments and the claimed invention, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A method of scrubbing a gas comprising:
    filling, at least partially, a weir trough of a gas inlet system of a gas scrubber with a liquid, wherein the weir trough is disposed above a scrubbing passage defined by a scrubbing vessel and at least partially surrounds a weir duct defining a weir duct passage;
    delivering liquid from the weir trough through an upper trough outlet of the weir trough and into the weir duct passage, wherein liquid exiting the upper trough outlet flows through the weir duct passage and subsequently flows downward into the scrubbing passage and facilitates wetting of an interior surface of the scrubbing vessel defining the scrubbing passage; and
    delivering liquid from the weir trough through a lower trough outlet of the weir trough and into the scrubbing passage, wherein liquid exiting the lower trough outlet facilitates wetting of the interior surface of the scrubbing vessel defining the scrubbing passage;
    introducing a gas and a scrubbing liquid into the scrubbing passage such that the gas and scrubbing liquid contact one another.

2. The method set forth in claim 1, wherein said delivering liquid from the weir trough through a lower trough outlet of the weir trough is performed during and after said filling a trough, and wherein said delivering liquid from the weir trough through an upper trough outlet of the weir trough is performed only after said filling a trough.

3. The method set forth in claim 2, further comprising continuously refilling the weir trough after said filling a weir trough and concurrently with said delivering liquid from the weir trough through an upper trough outlet of the weir trough, said delivering liquid from the weir trough through a lower trough outlet of the weir trough, and said introducing a gas and a scrubbing liquid into the scrubbing passage.

4. The method set forth in claim 1, wherein said delivering liquid from the weir trough through an upper trough outlet of the weir trough comprises overflowing the liquid relative to the upper end of the weir duct such that the liquid flows into a weir duct inlet defined by an upper end of the weir duct and into the weir duct passage.

5. The method set forth in claim 1, wherein said introducing a gas and a scrubbing liquid comprises introducing the gas downward through the weir duct passage and into the scrubbing passage, and introducing the liquid upward within the scrubbing passage and below the weir duct passage.

* * * * *